United States Patent [19]

Goffe et al.

[11] 4,040,826

[45] Aug. 9, 1977

[54] IMAGING SYSTEM OF MIGRATION MATERIAL IN SOFTENABLE LAYER

[75] Inventors: William L. Goffe, Webster; Joseph Mammino, Penfield; Joan R. Ewing, Rochester, all of N.Y.

[73] Assignee: Zerox Corporation, Stamford, Conn.

[22] Filed: Apr. 22, 1976

[21] Appl. No.: 679,308

Related U.S. Application Data

[62] Division of Ser. No. 837,591, June 30, 1969, Pat. No. 4,013,462.

[52] U.S. Cl. ......... 96/1 PS; 96/1.1; 96/1.5; 96/1.8; 250/315 R; 250/315 A; 346/158; 346/160; 346/153; 360/56; 427/145; 427/161

[51] Int. Cl.[2] ............... G03G 5/04; G03G 16/00

[58] Field of Search... 96/1, 1.1, 1.5, 1.8, 1 R, 27 R, 1 PS; 178/6.6; 204/180, 181; 250/315 A, 315 R; 340/173; 346/153, 158, 160; 360/56; 427/145, 161

[56] References Cited

UNITED STATES PATENTS

| | | | |
|---|---|---|---|
| 3,450,831 | 6/1964 | Gaynor | 178/6.6 |
| 3,452,969 | 12/1964 | Ewing | 96/1.1 |
| 3,254,997 | 6/1966 | Schaffert | 96/1.R |
| 3,561,957 | 2/1971 | Perry | 96/1.5 |
| 3,138,458 | 6/1964 | Kimble et al | 96/1.3 |
| 2,901,348 | 8/1959 | Dessauer | 96/1.5 |
| 3,032,414 | 5/1962 | James et al | 96/75XR |
| 3,243,293 | 3/1966 | Stockdale | 96/1.5 |
| 3,652,270 | 3/1972 | Yamashita | 96/1.5 |

*Primary Examiner*—Edward C. Kimlin
*Attorney, Agent, or Firm*—J. J. Ralabate et al.

[57] ABSTRACT

Migration material dispersed throughout a softenable layer is caused to imagewise selectively migrate to at least locations in depth in the softenable layer, by (A) subjecting said migration material to an imagewise migration force and changing the resistance of said softenable layer, to migration of migration material or by (B) subjecting said migration material to a migration force and imagewise changing the resistance of said softenable layer to migration of migration material.

14 Claims, 4 Drawing Figures

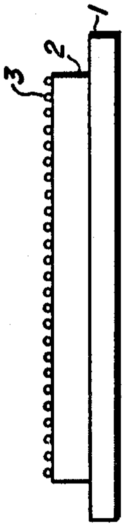
FIG. 1 (INCORPORATED APPLICATION)
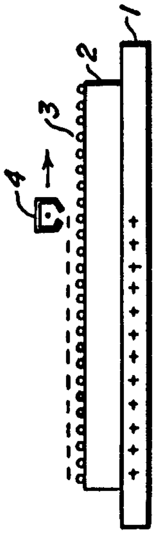
FIG. 2 (INCORPORATED APPLICATION)
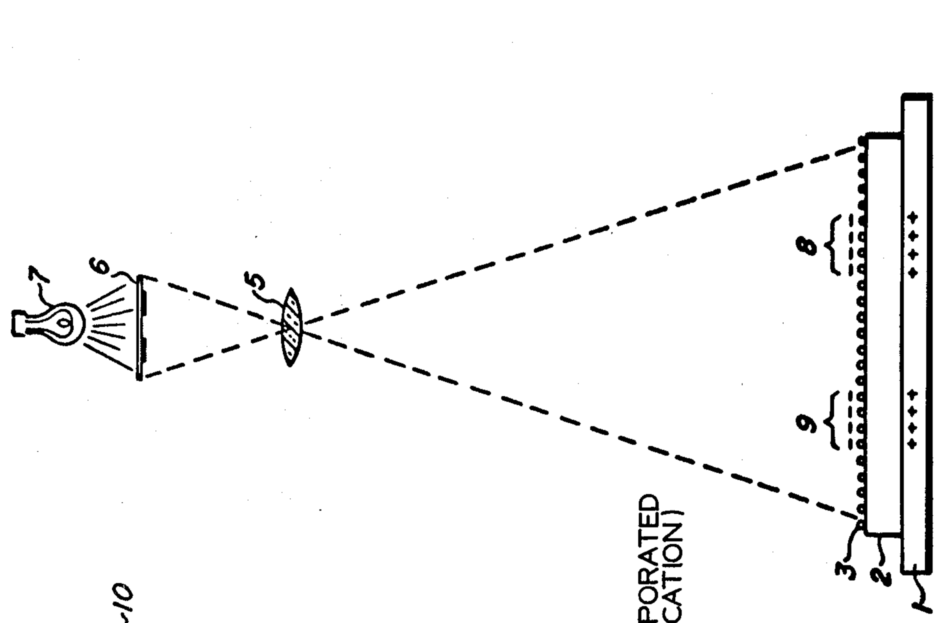
FIG. 3 (INCORPORATED APPLICATION)
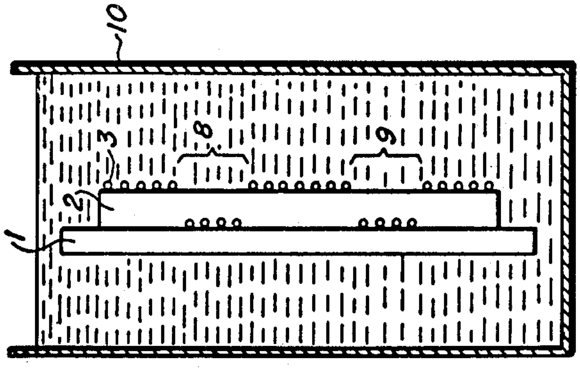
FIG. 4 (INCORPORATED APPLICATION)
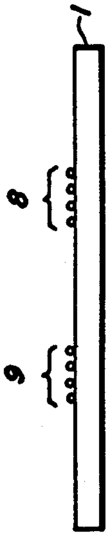
FIG. 5 (INCORPORATED APPLICATION)

IMAGING SYSTEM OF MIGRATION MATERIAL IN SOFTENABLE LAYER

This is a division of application Ser. No. 837,591, filed June 30, 1969, now U.S. Pat. No. 4,013,462.

CROSS-REFERENCES TO RELATED APPLICATIONS

This application is a continuation-in-part of application Ser. No. 634,757, filed Apr. 28, 1967, now abandoned.

BACKGROUND OF THE INVENTION

This invention relates in general to imaging, and more specifically, to a migration imaging system.

There has been recently developed a migration imaging system capable of producing high quality images of high density, continuous tone, and high resolution. This system is described in the above mentioned application Ser. No. 403,002, now abandoned. In a typical embodiment of this imaging system, an imaging structure comprising a conducting substrate coated with a layer of softenable or soluble material, overcoated with a layer of photosensitive particles is imaged in the following manner: An electrostatic latent image is formed on the photosensitive surface; e.g., by uniform electrostatic charging and exposure to a pattern of activating electromagnetic radiation. The image is then developed by exposing the plate to a solvent which dissolves only the soluble layer. The photosensitive particles which have been exposed to radiation migrate through the softenable layer as it is softened and dissolved, leaving an image on the conductive substrate conforming to a negative of the original. This is known as a positive-to-negative image. Through the use of various techniques, either positive-to-positive or positive-to-negative images may be made depending on the materials used and the charging polarities. Those portions of the photoconductive layer which do not migrate to the conductive substrate may be washed away by the solvent with the softenable layer, or where other developing techniques are used, the softenable layer may at least partially remain behind on the substrate.

In general, three basic imaging members may be used: a layered configuration which comprises a substrate coated with a layer of softenable material, and a fracturable and preferably particulate layer of photosensitive material on or embedded at or near the upper surface of the softenable layer; a binder structure in which the photosensitive particles are dispersed in the softenable layer which overcoats a substrate; and an overcoated structure in which a substrate is overcoated with a layer of softenable material followed by an overlayering of photosensitive particles and a second overcoating of softenable material which sandwiches the photosensitive particles.

In another recently developed imaging system, as disclosed in copending application Ser. No. 520,423, now abandoned, filed Jan. 13, 1966, an image is formed by the selective disruption of a layer of particulate material overlaying an electrostatically deformable film or layer. The imaging structure used in this system is substantially the same as that used in the imaging system already described above, and involves exposing the charged member to an optical image to selectively relocate the charge and form a developable charge pattern. The softenable layer is then developed or softened by heat whereupon the particulate layer is selectively disrupted, resulting in a rearrangement of the particles to form an image viewable by reflected or transmitted light. When the structure is developed by heat, the photosensitive area or layer is disrupted and the photosensitive particles are thereby selectively rearranged to change the optical properties of the plate. The image is believed to be formed because the particles drift on top of one another and accumulate in valleys or pockets of the deformation image leaving the raised portions of the image uncovered. This imaging system is believed to be substantially due to a surface disruption effect with no substantial migration of the photosensitive particles within the softenable layer. This final image differs from that described above, in that the softenable layer is deformed in conjunction with a disruption of the photosensitive particles.

Another related imaging system is directed to the formation of a migration image, and comprises exposing an imaging member to a vapor or heat to form a migration image composed of photosensitive particles, followed by heating said structure, whereby a high density image having low background is produced. This system is described and claimed in copending application Ser. No. 612,122, filed on Jan. 27, 1967. If desired, the migration image formed above may be utilized as a separate image without resorting to the heating step.

These imaging processes usually comprise a combination of process steps which include charging, exposing, and developing with a solvent, its vapor, or heat. The characteristics of these images are dependent on such process parameters as potential, exposure, and development time, as well as the particular combination of the process steps. High density, continuous tone and high resolution are some of the photographic characteristics possible. The image is characterized as a fixed or unfixed photoconductive powder image which can be used in a number of applications such as microfilm, hard copy, optical masks, and stripout applications, using adhesive materials. Alternative embodiments of this concept are further described in the above cited copending applications.

In a related imaging system described in copending application 483,675, filed Aug. 30, 1965, nonphotoconductive particulate material is used to form images in the mode already defined above. In this system, a developable image is formed by charging in image configuration through the use of a mask or stencil. This image is then developed in a solvent for the softenable material. Alternative embodiments of this concept are further described in the above cited copending applications.

Although the above mentioned layered configuration presently used in migration imaging produces images having high quality, it is desirable that other structures be employed which would enable a wider variety of photosensitive materials to be easily employed in the system. With the present layered configuration, certain photoconductors such as selenium, are more advantageously used in a layered configuration, while other inorganic materials, such as, for example, zinc oxide and organic materials such as phthalocyanine may be more advantageously used in configurations other than a layered structure. It is noted that in the above mentioned layered configuration, close tolerances in the particle size of the photosensitive particles are typically maintained to achieve optimum images. A particle size thickness of about 1 or 2 microns or less is usually preferred.

In a new area of technology such as migration imaging, new methods, apparatus, and structures are often discovered for the performance of the novel system in a new mode. The present invention relates to new and advantageous embodiments of migration imaging systems.

SUMMARY OF THE INVENTION

It is, therefore, an object of this invention to provide an imaging system which satisfies the above noted needs.

It is another object of this invention to provide a novel migration imaging system.

It is another object of this invention to provide a migration imaging system in which images are produced using a wide range of non-photosensitive as well as photosensitive materials.

It is another object of this invention to provide a binder structured migration imaging member.

It is yet another object of this invention to provide an imaging member which is more easily and economically manufactured than previous imaging members.

It is yet another object of this invention to provide an imaging system capable of producing images of high quality and excellent resolution.

It is still another object of this invention to provide an imaging system capable of producing images suitable for various applications such as microfilm, hard copy, optical masks, and others The foregoing objects and others are accomplished in accordance with this invention by providing a novel migration imaging system employing a binder structured imaging member wherein migration marking particles are dispersed throughout a softenable layer which typically overcoats a substrate.

The binder structured imaging member of this invention may be variously referred to as an imaging member, film, plate, or the like. These plates are prepared by mixing any suitable migration marking material with a suitable softenable material. For instance, any suitable photosensitive pigment, either organic or inorganic, may be mixed with a resin diluted in a solvent. The thoroughly mixed binder mixture is then typically coated onto a suitable substrate.

Such binder structured imaging members may then be imaged by any type of migration imaging procedure. Imaging usually includes providing a binder structured migration imaging members and causing the migration marking material of said member to migrate imagewise in increasing depth in the softenable material by imaging steps comprising subjecting the migration material to a migration force and changing the resistance of said softenable layer to migration of the migration material. Such procedures often typically involve charging and exposing, followed by development in a suitable solvent, its vapor, or by heat, as disclosed in the above mentioned copending applications.

These binder structures have the inherent advantage of ease and economy in regard to manufacturing procedures, and provide exceptionally high quality images in which resolutions exceeding 200 line-pairs per mm. have been attained. Through the use of this structure, greater flexibility is employed in utilizing marking materials and/or binder materials which may be easily mixed to form a binder layer, obviating the need for separate coating steps which are required in forming the layered configuration migration imaging members.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein:

FIG. 1 is a partially schematic, cross-sectional view of a preferred embodiment of the binder structured migration imaging member.

FIG. 2 illustrates a preferred embodiment of the migration imaging process of the present invention in partially schematic cross-sectional views.

FIG. 3 is a partially schematic cross-sectional view of another embodiment of the binder structured migration imaging member.

FIG. 4 is a partially schematic cross-sectional view of still another embodiment of the binder structured migration imaging member.

DESCRIPTION OF THE PREFERRED EMBODIMENTS

FIG. 1 illustrates a typical embodiment of the binder structured migration imaging member of the advantageous system of the present invention. The binder imaging member 10 comprises a layer of softenable material 11 throughout which particles of migration marking material 12 are dispersed. This matrix of marking material dispersed in softenable material is typically overcoated upon a suitable substrate 13.

A particularly preferred embodiment of the binder structured migration imaging member, and one suitable for use in the optimum charge-expose imaging process of this invention, is the imaging member 10 of FIG. 1 wherein the softenable layer 11 is typically chemically inert and substantially electrically insulating. In this preferred embodiment, marking particles 12 are particles of a photosensitive material and are substantially homogeneously dispersed throughout softenable layer 11 to form a binder layer. The binder layer is overcoated with a thin layer of a substantially electrically conductive material 14.

The softenable material 11 may be any suitable material which may be softened by liquid solvents, solvent vapors, heat, or combinations thereof. In addition, in many embodiments of the migration imaging member, such as the embodiment just described, the softenable material 11 is typically substantially electrically insulating and chemically inert during the migration force applying and developing steps of the advantageous system of the present invention. It should be noted that layer 11 should preferably be substantially electrically insulating for the preferred modes hereof of applying electrical migration forces to the migration layer but more conductive materials may be used because of the increased capability in the electrical mode hereof of applying a constant and replenishing supply of charges in image configuration. In these optimum and preferred modes, it is found that higher conductivity softenable layers 11 are accompanied by charge injection from the substrate into layer 11 and/or by other conductivity-related mechanisms which discharge layer 11 causing removal of the coulombic migrating force on the particle before migration has occurred satisfactorily. Where the softenable layer is to be dissolved either during or after imaging, it should be soluble in a solvent which does not attack the marking particles.

"Softenable" as used herein to describe layer 11 is intended to mean any material which can be rendered more permeable to particles migrating through its bulk. Conventionally changing permeability is accomplished by softening.

Typical softenable materials include Staybelite Ester 10, a partially hydrogenated rosin ester, Foral Ester, a hydrogenated rosin triester, and Neolyne 23, an alkyd resin, all from Hercules Powder Co.; SR 82, SR 84, silicone resins, both obtained from General Electric Corp.; Sucrose Benzoate, Eastman Chemical; Velsicol X-37, a polystyrene-olefin copolymer from Velsicol Chemical Corp. Hydrogenated Piccopale 100, a highly branched polyolefin, Piccotex 100, a copolymer of methyl styrene and vinyl toluene, Piccolastic A-75, 100, and 125, all polystyrenes, Picodiene 2215, a polystyrene-olefin copolymer, all from Pennsylvania Industrial Chemical Co.; Araldite 6060 and 6071, epoxy resins from Ciba; R5061A, a phenylmethyl silicone resin, from Dow Corning; Epon 1001, a bisphenol A-epichlohydrin epoxy resin, from Shell Chemical Corp.; and PS-2, PS-3, both polystyrenes, and ET-693, a phenol-formaldehyde resin, from Dow Chemical; and 96-A, a custom synthesized 80/20 mole percent copolymer of styrene and hexylmethacrylate having an intrinsic viscosity of 0.179 dl./gm.

Other typical softenable materials include other custom synthesized copolymers of styrene and hexylmethacrylate, a custom synthesized polydiphenylsiloxane; a custome synthesized polyadipate; acrylic resins available under the trademark Acryloid from Rohm & Haas Co., and available under the trademark Lucite from the E. I. DuPont de Nemours & Co.; thermoplastic resins available under the trademark Pliolite from the Goodyear Tire & Rubber Co.; a chlorinated hydrocarbon available under the trademark Aroclor from Monsanto Chemical Co.; thermoplastic polyvinyl resins available under the trademark Vinylite from Union Carbide Co.; other thermoplastics disclosed in Gunther et al. U.S. Pat. No. 3,196,011; waxes and blends, mixtures and copolymers thereof.

The above group of materials is not intended to be limiting, but merely illustrative of materials suitable for the softenable binder layer. The softenable layer may be of any suitable thickness, with thicker layers generally requiring a greter potential for charging. In general, a thickness up to about 16 microns has been found to give preferred results.

In the preferred embodiment described above the migration marking particles 12 are particles of a photosensitive material. Typical such photosensitive materials include inorganic or organic photoconductive insulating materials; materials which undergo conductivity changes when photo heated, for example, see Cassiers, Photog. Sci. Engr. 4, No. 4, 199 (1960); materials which photoinject, or inject when photoheated. The migration material preferably should be substantially insoluble in the softenable material and otherwise not adversely reactive therewith, and have similar characteristics vis-a-vis any solvent liquid or vapor which may be used in the softening step hereof.

Inorganic materials preferred for use as photosensitive materials are vitreous selenium, amorphous selenium, vitreous and/or amorphous selenium alloyed with arsenic, tellurium, antimony or bismuth, etc.; amorphous selenium or its alloys doped with halogens; and mixtures of amorphous selenium and the crystalline forms of selenium including the monoclinic and hexagonal forms. Other typical inorganic photoconductors include cadmium sulfide, zinc oxide, cadmium sulfoselenide, cadmium yellows such as Lemon Cadmium Yellow X-2273 from Imperial Color and Chemical Dept. of Hercules Powder Co., and many others. Middleton et al. U.S. Pat. No. 3,121,006 lists typical inorganic photosensitive pigments. Typical organic photoconductors include azo dyes such as Watchung Red B, a barium salt of 1-(4'-methyl-5'-chloro-azobenzene-2'-sulfonic acid)-2-hydrohydroxy-3-napthoic acid, C. I. No. 15865, a quinacridone, Monastral Red B, both available from DuPont; Indofast double scarlet toner, a Pyranthrone-type pigment available from Harmon Colors; qunido magenta RV-6803, a quinacridone-type pigment available from Harmon Colors; Cyan Blue, GTNF, the beta form of copper phthalocyanine, C. I. No. 74160, available from Arnold Hoffman Co.; Monolite Fast Blue Gs, the alpha form of metal-free phthalocyanine, C. I. No. 74100, available from Arnold Hoffman Co.; commercial indigo available from National Aniline Division of Allied Chemical Corp.; yellow pigments prepared as disclosed in French Patent Specification No. 1,467,288, or as disclosed in United Kingdom Patent Specification No. 1,145,373; quinacridonequinone from DuPont; sensitized polyvinyl carbazole; Diane Blue, 3,3'-methoxy-4,4'-diphenyl-bis-(1"-azo-2"-hydroxy-3"-naphthanilide), C. I. No. 21180, available from Harmon Colors; and Algol G. C., 1,2,5,6-di (D,D'-diphenyl)-thiazole-anthraquinone, C. I. No. 67300, available from General Dyestuffs and mixtures thereof. Naphthol Red B, 1-(2'-methoxy-5'-nitrophenylozo)-2-hydroxy-3"-nitro-3-naphthonilide, available from Collway Colors; and Indofast Yellow Toner, a flavanthrone, available from Harmon Colors. A particularly preferred photosensitive pigment which gives outstanding results is the *x* form of metal-free phthalocyanine produced by the method set forth in copending application Ser. No. 505,723, filed Oct. 29, 1965. The above list of organic and inorganic materials is illustrative of some of the typical materials, and should not be taken as a complete listing of photosensitive materials.

Any suitable photosensitive material or mixtures of such materials may be used in carrying out the invention, regardless of whether the particular material selected is organic, inorganic, is made up of one or more components in solid solution or dispersed one in the other, whether the layer is made up of different particles or made up of multiple layers of different materials.

Other materials which may be included in a photosensitive migration layer include organic donor-acceptor (Lewis acid-Lewis base) charge transfer complexes made up of donors such as phenolaldehyde resins, phenixies, epoxies, polycarbonates, urethanes, styrene or the like complexed with electron acceptors such as 2,4,7-trinitro-9-fluorenone; 2,3,5,7-tetranitro-9-fluorenone; picric acid; 1,3,5-trinitro benzene; chloranil; 2,5-dichloro-benzoquinone; anthraquinone-2-carboxylic acid, 4-mitrophenol; maleic anhydride; metal halides of the metals and metalloids of groups I-B and II-VIII of the periodic table including for example, aluminum chloride, zinc chloride, ferric chloride, magnesium chloride, calcium iodide, strontium bromide, chromic bromide, arsenic triiodide, magnesium bromide, stannous chloride etc.; boron halides, such as boron trifluorides; ketones such as benzophenone and anisil, mineral acids such as sulfuric acid; organic carboxylic acids such as acetic acid and maeic acid, succinic acid, citroconic acid, sulphonic acids such as 4-toluene sulphonic acid and mixtures thereof.

As stated above any suitable photosensitive material may be employed. In the optimum embodiment of the binder structured migration imaging member typical migration marking particles include those which are made up of only the pure photosensitive material or a sensitized form thereof, solid solutions or dispersions of the photosensitive material in a matrix such as thermoplastic or thermosetting resins, copolymers of photosensitive pigments and organic monomers, multilayered particles in which the photosensitive material is included in one of the layers and where other layers provide light filtering action in an outer layer or a fusible or solvent softenable core of resin or a core of liquid such as dye or other marking material or a core of one photosensitive material coated with an overlayer of another photosensitive material to achieve broadened spectral response. Other photosensitive structures include solutions, dispersions, or copolymers of one photosensitive material in another with or without other photosensitively inert materials. Other particle structures which may be used, if desired, include those described in U.S. Pat. No. 2,940,847 to Kaprelian. Also included are photosensitive materials wherein the change caused by radiation is permanent, persistent, or temporary. Also included are those particles which are thermoconductive, that is, the material is changed by the heating effects of the incident radiation.

The photosensitive material or particles, portions of which migrate at least in depth in layer 11 and sometimes to the substrate during image formation in various embodiments of the binder structured migration imaging member, may comprise any suitable electrically photosensitive material which is not readily soluble in any of the media used to soften the softenable layer during development of the migration imaging member.

Electrically photosensitive particles as used herein refers to any particles which when dispersed in a softenable electrically insulating binder or matrix layer as described herein, in response to electrical charging, imagewise exposure to activating radiation, and contact with suitable softening media, are caused to selectively migrate at least in depth in layer 11.

While photoconductive particles (and "photoconductive" is used in its broadest sense to mean particles which show increased electrical conductivity when illuminated with electromagnetic radiation and not necessarily those which have been found to be useful in xerography in serographic pigment-binder plate configurations) have been found to be a class of particles useful as electrically photosensitive particles in this invention and while the photoconductive effect is often sufficient in the present invention to provide in electrically photosensitive material, it does not appear to be a necessary effect. Apparently the necessary effect according to the invention is the selective relocation of charge into, within or out of the material or particles, said relocation being effected by light acting on the bulk or surface of the electrically photosensitive material, said relocation occurring before or during development, by exposing said material or particle to activating radiation which may specifically include photochemical effects and others which cause said selective relocation of charge. This also includes any effect of the exposure to activating radiation which changes the charge receptivity of the marking material in its environment in any specific embodiment. An increase in the charge receptivity of the marking particles before or during development would typically be advantageous.

The support member or substrate 13 may be electrically conductive or insulating. Conductive substrates as illustrated in the embodiment described with FIG. 1, generally facilitate the charging or sensitization of the member according to the optimum electrical-optical mode of the invention and typically may be of copper, brass, nickel, zinc, chromium, stainless steel, conductive plastics and rubbers, aluminum, steel, cadmium, silver, gold, or paper rendered conductive by the inclusion of a suitable chemical therein or through conditioning in a humid atmosphere to ensure the presence therein of sufficient water content to render the material conductive. The substrate may be in any form such as the metallic strip, sheet, coil, cylinder, drum, moebius strip, circular disc, or the like. If desired, the conductive substrate may be coated on an insulator such as paper, glass, or plastic. One example of this type of substrate comprises NESA glass, which is a substantially transparent tin oxide coated glass available from Pittsburgh Plate Glass Co. Another typical substrate comprises aluminized Mylar which is made up of a Mylar polyester film available from the E. I. DuPont de Nemours Co., Inc., having a thin, substantially transparent aluminum coating. Another typical substrate comprises Mylar coated with copper iodide. Other substrates include conductive resin coated films such as Dow Resin 2611-7 (Dow Chemical Company) or Conductive Polymer 261 (Calgon Corporation). It is therefore clear that where it is desirable to view the migration imaged member as a transparency using transmitted light, that a suitable, substantially transparent substrate is used. Of course, hard copy images suitable for viewing with reflected light may similarly be produced on any suitable opaque substrate.

Although the migration imaging member described in FIG. 1 is shown on supporting substrate 13, it will be appreciated that in various modes of the inventive imaging system, binder matrix layers comprising marking material 12 dispersed in softenable layer 11 may themselves be sufficiently self-supporting to allow their preparation separate from the imaging substrate. Such self-supporting imaging members may be imaged by processes involving selectively softening only portions of the area or thickness of the softenable material while the unsoftened portions thereof maintain sufficient integrity to continue to support the member. Typically such a migration imaging binder matrix is placed in contact with a suitable, desired substrate before or during the migration imaging process.

In another particularly preferred embodiment of the binder structured imaging member, an imaging member like that shown in FIG. 1 comprises softenable matrix 11 having photosensitive marking material 12 dispersed therein, and the softenable matrix is coated directly onto substrate 13 which is a dielectric or non-conductive support member. Any dielectric or insulating material is typically suitable for the substrate in this embodiment of the invention, for example, Mylar polyester film, available from duPont, in thicknesses up to about 3 mils is a particularly preferred insulating substrate. Any other insulating material compatible with the other materials used and suitable in the process steps of the inventive system may be used as the insulating substrate. For example, films of polyethylene terephthalate, polycarbonate, polysulfone, polyphenylene oxide, cellulose acetate, cellulose triacetate, cellulose nitrate, vinyl chloride, vinyl acetate; acrylic esters, such as methyl methacrylate, vinyl butryal, vinyl formal, polyvinylcarbazole, rubber chlorinated rubber, acrylonitrite resin rubber, polyamides, polyimides, coated and impregnated materials such as waxed paper, shellac coated cloth, epoxy impregnated cloth, glass, fibrous glass cloth, and comginations thereof. As before, the substrate may be either opaque or transparent, depending upon the way in which the finally imaged member is to be imaged and viewed.

Imaging processes using the binder structure imaging member having an insulating substrate may be accomplished by any of the methods described later herein for use with the imaging member having the conductive substrate, by additionally placing the insulating substrate of this imaging member in contact with a conductive member, typically grounded, and then creating the imagewise migration force across the imaging member, for example, by charging with a corona charge device. Alternatively, other methods known in the art of xerography for charging xerographic plates having insulating backings may also be applied. For example, the imaging member having the insulating substrate may be moved between two corona charging devices thereby similtaneously charging both surfaces to opposite potentials. This last described method is often referred to as "double-sided charging."

In another preferred embodiment, the migration marking particles 12 of FIG. 1 may be non-photosensitive particulate material which is either electrically conductive or insulating. Typical non-photosensitive or photosensitively inert materials useful in this embodiment include carbon black, garnet, iron oxide, dyed aluminum oxide, silica, clay, powered colored resins such as phenolic, epoxy bitumen, resin coated particles, various insoluble dyes and pigments and combinations thereof. The materials suitable for use in the other portions of this migration imaging member are the same as those listed for the previously described imaging members.

The migration imaging process utilizing this photosensitively inert migration imaging member can be any one of the processes described later herein whereby an imagewise migration force sufficient to cause migration of the marking particles is created across the imaging member in imagewise configuration. Where the electrostatic charge technique is used, the electrostatic image must typically be formed during charging because the photosensitively inert member will typically not respond to the uniform charge-expose mode of electrostatic latent imaging. However, a process comprising uniformly charging and then imagewise charging to the opposite polarity, neutralizing the initial charge in the process, produces a suitable latent image. Some other imaging methods suitable for use with this photosensitively inert imaging member are described in copending application Ser. No. 483,675, filed Aug. 30, 1965. For example, the processes involving charging through a mask stencil or by using shaped electrodes are particularly suited for use with this imaging member. Once an imagewise migration force is created across the member, the development and fixing steps may be performed in one of the methods described later herein.

In yet another embodiment, the migration marking particles 12 may comprise particulate magnetic material, and the imagewise migration force used in the migration imaging process is a magnetic field force acting on magnetic marking material. Suitable magnetic materials include iron, ferrous oxide, ferrix oxide, mixtures of iron oxide with one or more of the oxides of cobalt, barium, nickel, chromium, molybdenum, copper, aluminum, tungsten, and various combinations thereof.

In another preferred embodiment of the novel binder migration imaging member, softenable layer 11 of FIG. 1 may comprise a photosensitive or photoconductive material, as disclosed in copending application Ser. No. 553,837, filed May 31, 1966. The migration imaging process of the present invention can be performed using this imaging member with any of the imaging techniques described herein. For example, when the imaging member having a photoconductive softenable layer 11 is used in the imaging process described in FIG. 2, the photoconductive softenable layer 11 becomes conductive in the light struck areas shown in FIG. **2*b* thereby permitting discharge of the structure in the light struck areas, which removes charge formerly available to the marking particles in those areas, and thereby eliminates electric fields across the member in said areas. In this way an electrostatic latent image is typically formed on the imaging member. This image may then be developed by softening the softenable layer in one of the modes previously described, for example, by solvent liquid wash-away as shown in FIG. 2*c*. As the softenable layer softens during development, the marking particles 19 in FIG. 2*c*, which had retained charge after exposure, migrate to the surface of substrate 13**.

The softenable layer may comprise any photoconductive material which is capable of being softened so as to permit the marking particles to migrate toward the substrate during image formation. While the layer may be softened by heat, it is preferable that the softening be accomplished by a solvent liquid which does not attack the marking material, but which removes the softenable layer and unneeded portions of the marking material during imaging, leaving only those particles forming the image on the plate at the conclusion of the imaging steps. The soluble layer may comprise, for example, organic photoconductors in a resin, soluble photoconductive polymers, charge transfer complexes of certain aromatic resins with Lewis acids, and mixtures thereof. Typical organic photoconductors include anthracene, 2,5-bis-(p-aminophenyl)-1,3,4-oxadiazole; 2-aryl-4-arylidene-oxazolones; 4,5-diphenylimidazolidinone; 2,5-bis-(p-aminophenyl)-1,3,4-triazoles; 1,3-diphenyl-tetrahydroimidazoles, 1,2,3-triazines, 1,2,5,6-tetruazacyclooctatetranes-(2,4,6,8); quinazolines; 6-hydroxy-2-phenyl-3-(p-dimethyl aminophenyl)-benzofurane; thiazolidones; triphenylamines; and mixtures thereof. Typical aromatic resins which may be sensitized with Lewis acids include: polyvinylcarbazole, epoxy resins, phenoxy resins, phenol-formaldehyde resins, polystyrenes, polycarbonates, polysulfones, polyphenylene oxide and mixtures thereof. Typical Lewis acids which may be used to sensitize the above resins include 2,4,7-trinitro-9-fluorenone; 4,4-(dimethyl-amino) benzophenone; chloranil; 1,3,5-trinitrobenzene, and mixtures thereof.

Surprisingly, it has been found that any sort of marking material is suitable for use as the migration marking particle 12 in the binder structure migration imaging member having marking particles dispersed in a photoconductive softenable layer. Any sort of inert, conductive, insulating, photosensitive, or photosensitively inert material will satisfactorily perform the function of marking particles 12. Typical materials ininclude pigments, both organic and inorganic, such as: titanium dioxide, powdered iron, iron oxide, barium sulfate, carbon, phthalocyanine, graphite, dyes, garnet, tungsten, other organic materials capable of being formed into particles, the photosensitive and inert materials named above as suitable in various other embodiments of the member, and mixtures of any of these materials.

The surprising result that any sort of migration marking particle and mixtures of any combination of marking particles perform most satisfactorily in the migration imaging system of this invention is not unique to the photoconductive binder member just described. Mixtures of the various marking materials perform satisfactorily in all the imaging member embodiments when such members are used in an appropriate mode of the imaging system. That is, it has been found that mixtures of various inert, conductive, insulating, photosensitive and/or photosensitively inert marking materials migrate in response to appropriate imagewise migration force just as the individual materials migrate in embodiments having a single marking particle material.

Where the migration marking material comprises a substantially electrically conducting material or combination of such materials, images produced by the inventive system may be made in the form of and used satisfactorily as printed circuits.

In another specific embodiment of the binder structured migration imaging member, and one having a combination of photosensitively inert marking particles, the member shown in FIG. 3 comprises softenable material layer 11 having marking particles 12 dispersed therein, and the softenable material 11 is contacting a suitable imaging substrate 13. At the upper surface of softenable layer 11, a layer 21 of migration material is contiguous to the surface of the softenable layer 11. The material of the contiguous fracturable layer may be coated onto, or slightly, partially, or substantially embedded in the softenable material at the surface of said softenable material. This layer 21 is typically a fracturable layer of particulate marking material, or a semi-continuous fracturable layer, for example, a Swiss cheese pattern, which is capable of breaking up into discrete particles of the size of an image element or less during migration imaging development. In certain embodiments, the layer 21 may even be non-fracturable. Such migration material layers are fully described in copending application Ser. No. 725,676, filed May 1, 1968.

While layer 21 is preferably fracturable and optimally particulate, non-fracturable layers, preferably perforated may also be used to obtain images. Thus, it is seen that the mechanical characteristics of layer 21 may vary over a wide range. Because the mechanical characteristics of layer 21 may vary so widely, any one of a great number of methods of forming layer 21 may be used. Typical methods include deposition by vacuum evaporation techniques such as disclosed in French Patent Specification No. 1,466,349. The fracturable form of layer 21 may also be formed by other methods such as by cascading, dusting, etc. as shown in French Specification No. 1,466,349, or by stripping and other methods as described in U.S. Application Ser. No. 685,536, filed Nov. 24, 1967 or any other suitable method. If thicker coatings are desired, layer 11 may be softened slightly be heating, for example, to permit particles deposited on its surface to seat themselves, i.e. to sink a short distance into the plastic after which additional particles may be cascaded across or dusted over the plate.

The thickness of layer 21 is preferably from about 0.01 to about 2.0 microns thick, although five micron layers have been found to give good results for some materials.

When layer 21 comprises particles, a preferred average particle size is from about 0.01 to about 2.0 microns to yield images of optimum resolution and high density compared to migration layers having particles larger than about 2.0 microns. For optimum resultant image density the particles should not be much above about 0.7 micron in average particle size. Layers of particle migration material preferably should have a thickness ranging from about the thickness of the smallest element of migration material in the layer to about twice the thickness of the largest element in the layer. It should be recognized that the particles may not all be packed tightly together laterally or vertically so that some of the thickness of layer 13 may constitute softenable material.

Layer 21 may comprise any suitable material selected from an extremely broad group of materials and mixtures thereof including electrical insulators, electrical conductors, photosensitive materials and optically inert particles. For the modes hereof employing an electrical migration force the migrating portions of layer 21 should be sufficiently electrically insulating to hold their electrical migration force until the desired amount of migration has occurred. Conductive particles may be used, however, if lateral conductivity is minimized by loose packing, for example, or by partly embedding only a thin layer of particles in softenable layer 11 so that neighboring particles are in poor electrical contact.

In the embodiment shown in FIG 3, good imaging results are obtained with an imaging member wherein marking particles 12, dispersed in the sofenable layer, are photosensitive particles, or a mixture of particles which is substantially photosensitive, and the marking material of fracturable layer 21 is substantially photosensitively inert. Similarly, good imaging also results when the member comprises the opposite combination, i.e., substantially photosensitively inert dispersed marking material 12 and photosensitive fracturable layer 21. In either case good migration images result when the member is used in any of the various migration imaging processes described herein.

In still another embodiment of the advantageous binder structured imaging member of this invention, the member shown in FIG. 4 comprises softenable layer 11 having marking material 12 dispersed therein and suitable imaging substrate 13. In addition, in this embodiment an additional softenable layer 22 lies between the substrate 13 and overlying softenable binder matrix 11. It will be appreciated that even with this new embodiment, any of the above described structures and modifications can be incorporated in a member which produces satisfactory migration images in the present inventive system. Similarly, one or more layers containing marking material dispersed therein may be used in a suitable binder structured imaging member and system.

In addition to the configuration shown in FIG. 1, with or without substrate 13, additional modifications in the basic structure such as an overcoated structure in which the binder structured migration matrix is sandwiched between two other layers of softenable material may also be used. The overcoating layer may also be nonsoftenable such as gelatin or Mylar which may or may not contact the migration marking material. Also, multiple layers each layer comprising a migration material in a softenable layer may be used.

Also the softenable layer may comprise one or more layers of different softenable materials. As a further variation, one of the layers of softenable material may be stable against agglomeration of the migration material and another layer unstable against agglomeration to enhance the agglomerating, background reducing effect as described in Belgian Patent Specification No. 709,703 wherein the optical transmission of the unmigrated marking material is greatly increased by an agglomeration effect of the unmigrated material to substantially transparentize these portions of the imaging member.

The binder structure of FIG. 1 may be produced by any suitable method known to the art. Typical methods include cascading or dusting the photosensitive particles over the softenable layer 11, which the softenable layer is subjected to heat. These methods and others are disclosed in copending application Ser. No. 460,377, filed June 1, 1965. A particularly satisfactory method involves mechanically mixing the photosensitive particles and the softenable material diluted in a small amount of solvent, and then draw coating the resultant binder mixture over any suitable substrate and allowing the coating to dry.

The binder layer film thicknesses for the aforementioned binder structures typically range from about ½ to about 16 microns thick. If the layer is thinner than about ½ micron, excessive background may result upon development, while layers thicker than about 16 microns may require relatively long development time resulting in lower image contrast density.

In general the particle size for the migration marking particles dispersed in the binder structure migration imaging member is about 2 microns or less. Submicron particles give even more satisfactory results. Practically, it may be difficult to produce or measure particles of a size less than about 0.02 micron. A preferred range of particle sizes is from about 0.02 micron to about 0.5 micron. These smaller particles give migration images which have better resolution and image densities than larger particles, although larger particles, even those greater in size than 2 microns may produce satisfactory images in the inventive system. Of course the thickness of the matrix of softenable material is usually another practical limitation on the larger particle sizes.

The imaging process by which the binder structured imaging member is imaged typically comprises the following steps. First a typical binder structured imaging member is provided and an imagewise migration force, which is typically an electrical field interacting with charged particles, is placed across the thickness of the imaging member. The softenable layer is then softened by the application of any suitable softening medium, and as the softenable layer is softened, the migration marking material migrates in imagewise configuration toward the surface of the substrate. In various embodiments of the migration imaging system, the imagewise migration force applying and softening steps may be performed simultaneously or in inverse order with perfectly satisfactory results.

A particularly preferred embodiment of the migration imaging process of the advantageous system of the present invention is illustrated in FIG. 2 wherein a FIG. **2*a* a binder structured migration imaging member comprising softenable layer 11 having photosensitive migration marking particles 12 dispersed therein, and said softenable layer overlying suitable conductive substrate 13, is illustrated being substantially uniformly electrostatically charged. The electrostatic charging step is typically accomplished by means of a corona charging head 15 which scans the upper surface of the binder structure and deposits the uniform charge on its upper surface as it passes over the structure. During the electrostatic charging step, the substrate is typically electrically grounded for preferred results. Typical corona charging methods and devices are described in Walkup Patent 2,777,957 and Carlson Patent 2,588,699. Corona charging is preferred because of its ease and because of the consistency and quality of the images produced when corona charging is employed. However, any suitable source of corona may be used including radioactive sources as described in Dessauer, Mott, Bogdonoff Photo Eng. 6,250 (1955). However, other charging techniques ranging from rubbing the member, to induction charging, for example, as described in Walkup U.S. Pat. No. 2,934,649 are available in the art. Although the specific embodiment illustrated in FIG. 2*a*** is shown with positive electrostatic charges being applied to its upper surface, it will be appreciated that in various embodiments of the binder structured migration imaging member and of the imaging process wherein said binder is used, that the charge placed on the surface of the imaging member may be either positive or negative.

In the partially schematic cross-sectional drawings of FIG. 2, the particles 12 of migration marking material are illustrated much larger than scale or the particles 12 in the accompanying drawings. The larger illustrated particles facilitate the schematic illustration of the migration of the marking material during the migration imaging process.

After the surface of the imaging member has been uniformly charged as illustrated in FIG. **2*a* the charged imaging member is exposed to a selective pattern of activating electromagnetic radiation 16, for example light, as illustrated in FIG. 2*b***.

Any suitable activating electromagnetic radiation may be used. Typical types include radiation from ordinary incandescent lamps, X-rays, beams of charged particles, infra red, ultra violet and so forth. The imagewise exposures may be before, during or after charging and before or during the period when the softenable layer is in a softened condition wherein the photosensitivity employed is permanent, persistent or temporary. Also the latent image may result from the heating effects of the incident radiation pattern, either on the softenable layer or the migration marking material to produce an imagewise change in conductivity thereby producing an electrical migration force pattern. The above described process embodiment of the electrical-optical imaging mode hereof is preferred because of its simplicity, versatility and because of the high quality images produced. Any suitable exposure level may be used. Exposures for optimum quality images will depend on many factors including the composition of the photosensitive migration material.

For example, exposures such as about ½ f.c.s. may be used for photosensitive migration material comprising certain phthalocyanines.

Exposures may be from the binder layer side or through the rear of a member, with a softenable layer and a support (if used) which are at least partially transparent to the activating radiation.

Any means suitable for producing a selective image pattern of activating radiation may be used for exposing the charged imaging member in accordance with this process step. For example, an optical mask, such as an ordinary photographic transparency, may have light projected through it by conventional projection apparatus, which can also focus the selective image pattern upon the charged migration imaging member, as desired.

Following exposure, the charged imaging member supports a pattern of electrostatic charge in imagewise configuration typically conforming a negative of the selective pattern of activating radiation to which the charged member was exposed. In the charge-expose mode of the inventive imaging process, this selective pattern of charge upon the imaging member is typically an electrostatic latent image. The exposed imaging member supporting the electrostatic latent image is then developed by softening softenable layer 11 by any suitable means. In FIG. 2*c* the imaging member is shown being developed by immersion in a solvent liquid 17 which is contained in any suitable bath or tank 18. Development by the application of a solvent liquid is commonly referred to as "wash-away" development. The developing time in the illustrated mode is for relatively short period (usually 1 to 20 seconds) at which time the previously charged photosensitive particles 12 which have not been exposed to radiation, migrate through the softenable layer 11 as it is softened and dissolved, and adhere to the conductive substrate 13 in imagewise configuration as illustrated at 19. Unmigrated marking particles 12 are illustrated being washed away from the developing imaging member in a solvent bath 17.

In FIG. 2*d* the fully, wash-away developed migration imaging member of the inventive system is illustrated showing the migrated photosensitive particles 12 adhering in imagewise configuration 22 on the surface of conductive substrate 13. This fully developed, migration imaging member is then suitable for use in any process whereby the image is fixed to the substrate, where such fixing is desirable. For example, methods of fixing migration images to substrates are disclosed in copending application Ser. No. 590,959, filed Oct. 31, 1966, and Ser. No. 695,214, filed Jan. 2, 1968. In one fixing method the developing liquid softens the conducting substrate or a thin film on the substrate so that the image particles can become embedded in the substrate or thin film. In other method, the developing liquid evaporates and leaves a coating of dissolved plastic over the image. Where the marking particle comprises organic material, e.g., spray dried resin powders, although the material should not be entirely soluble in the solvent for the sofenable layer, it is often desirable that the surface of said particles be slightly soluble in the solvent so that the particles reaching the substrate are at least slightly tacky and are self-fixing when the solvent is evaporated off. By using additional process steps after development, images can be fixed by either overcoating the image particles, or by embedding them in the conducting substrate or in a thin film on the substrate. Such fixing prevents abrasion of the image or loss of image density.

The developer solvent 17, may comprise any suitable liquid or vapor in which the softenable soluble layer dissolves, while leaving unaffected on the supporting substrate the migration marking material in the form of the original image. The only requirement of the solvent is that it be a solvent for the softenable layer only, and that it be substantially electrically insulating in the sense that the charged image is not discharged electrically by exposure to the solvent before the imagewise migration is completed. The time of exposure to the solvent typically not critical, inasmuch as the substrate and photosensitive material are selected so as to be substantially insoluble during development. In general, a few seconds of immersion in the solvent is more than sufficient to dissolve away the softenable material. Typical solvents are acetone, Freon TMC, available from DuPont; trichloroethylene, chloroform, ethyl ether, xylene, dioxane, benzene, toluene, cyclohexane, 1,1,1-trichloroethane, pentane, n-heptane, Odorless Solvent 3440 (Sohio), trichlorotrifluoroethane available under the designation Freon 113, from DuPont; M-xylene, carbon tetrachloride, thiophene, diphenyl ether, p-cymene, cis-2,2-dichloroethylene, nitromethane, N,N-dimethyl formide, ethanol, ethyl acetate, methyl ethyl ketone, ethylene dichloride, methylene chloride, 1,1-dichloroethylene, trans 1,2-dichloroethylene, and Super Naptholite (Buffalo Solvents and Chemicals), and mixtures thereof.

In addition to the charge-expose mode of providing an imagewise migration force across a binder structured imaging member, comprising a softenable matrix having photosensitive marking particles dispersed therein and typically supported upon an imaging substrate, as amply described above, it is now noted that any means for providing such a migration force may be suitable for use in the advantageous system of the present invention. Broadly, the imaging methods of this invention can be divided into two modes:

(A) applying to the migration marking material an imagewise migration force, which typically is associated with a latent imagewise change of the imaging member which changes directly or indirectly the force on the migration material toward the bulk of the softenable layer and typically toward a face of the softenable material or, where a substrate is used, toward the substrate-softenable layer interface; said migration material force applying step occurring before, during or after a second step of changing the resistance of said softenable material to migration of migration material; and (B) applying to the migration marking material a migration force before, during or after a second step of imagewise changing the resistance of said softenable material to migration of migration material.

By either mode (A) or (B) above there are a variety of forces which can be applied to and be made to act on the migration marking material to cause it to move in image configuration in depth in a softenable layer. Such forces include electrical or electrostatic, magnetic, gravitational, and centrifugal forces. An even greater variety of ways exists in which these forces can be made to act on a migration material either uniformly or imagewise.

Evidencing the versatility of this invention, modes of imagewise applying an imagewise migration force to migration marking material hereof according to mode (A) above include:

(a) applying an imagewise charge to a binder structure migration imaging member which produces an imagewise attraction of the migration marking material to opposite polarity charges induced, by the charges originally applied on the migration imaging member, on the opposite face of the softenable layer or on the substrate of an imaging member;

(b) applying an imagewise external electric field acting on a uniformly charged migration binder structured imaging member;

(c) applying a uniform external electric field acting on an imagewise charged binder structured migration imaging member.

It will be seen that the strength of an imagewise electrical or electrostatic migration force, the preferred migration force of this invention, will depend upon the strength of the electric charge on or in the migration marking material and the strength of any external electric field. The generation of the charge on or in the migration marking material may be affected by:

(i) the distribution of the charge put on or in the structure including on or in the migration material;

(ii) the ability of the migration material to hold charge;

(iii) the ability of the softenable layer to hold charge;

(iv) the magnitude of the electric field through the imaging member.

Modes of applying a migration force to migration marking material hereof in mode (B) where this force is accompanied by imagewise changing the resistance of said softenable material to migration of migration material include:

(a) applying a uniform charge to a binder structured migration imaging member which produces a uniform attraction of the migration material to opposite polarity charges induced, by the uniform charge layer originally applied on the migration imaging member, on the opposite face of the softenable layer or on the substrate of the imaging member;

(b) applying an external electric field to act on the uniformly electrostatically charged binder structured migration imaging member;

(c) applying magnetic fields acting on uniformly magnetized binder structured migration imaging members;

(d) applying centrifugal forces on the binder migration imaging member;

(e) applying gravitational forces on the binder migration.

In mode (B) it will also be seen that imagewise changing the resistance to migration of migration marking material through the softenable layer includes any change of the softenable material or the migration material which directly or indirectly changes the softenable material's viscosity during migration in the region in which the migration material moves or which in any other way changes the viscous drag of migration material in the softenable material.

A variation of the electrical-optical mode is to imagewise heat radiate in the exposure step a thermoconductive softenable layer and/or binder structured migration imaging members, the electrical conductivity of which changes with temperature. Of course, imagewise heating may also be accomplished by nonexposure techniques such as contacting the structure to a heated member in an image configuration. The particles may become quickly discharged or changed in their ability to hold charge, or the discharge or change may occur subsequently in the softening step hereof.

According to a preferred process embodiment of the preferred electrical migration force modes hereof, mode A(a) disclosed above, a latent electrostatic image of a type similar to those found in xerography is typically placed in or on the binder structured imaging members hereof by any suitable means, typically which does not employ direct optical exposure of the imaging member, which does not destroy the functionality of the imaging members hereof including:

(i) Charging in image configuration through the use of a mask or stencil:

(ii) First forming such a charge pattern on a separate photoconductive insulating layer according to conventional xerographic reproduction techniques and then transferring this charge pattern to the members hereof by bringing the two layers into very close proximity and utilizing breakdown techniques as described, for example, in Carlson U.S. Pat. No. 2,982,647 and Walkup U.S. Pat. Nos. 2,825,814 and 2,937,943;

(iii) Charge patterns conforming to selected, shaped, electrodes or combinations of electrodes may be formed by the "TESI" discharge technique as more fully described in Schwertz U.S. Pat. Nos. 3,023,731 and 2,919,967 or by techniques described in Walkup U.S. Pat. Nos. 3,001,848 and 3,001,849;

(iv) Electron beam recording techniques, for example, as described in Glenn U.S. Pat. No. 3,113,179 or x-ray beam recording techniques wherein x-rays cause secondary emission of electrons which cause the subsequent deposition of charge on members hereof, for example, as described in Reiss, Image Production With Ionizing Radiation Through Electrostatic Accumulation from Electron Avalanches, Zeit. fur Angew. Phys. 19, 1, pp. 1–4 (1965), and Kaprelian U.S. Pat. No. 3,057,997; and (v) Using a migration member hereof with a photoconductor layer between the softenable layer 11 and the substrate 13. The latent image is formed by typical frost wrinkling sequences, for example, charge, imagewise expose, and recharge to the original potential such as described in Gunther et al. U.S. Pat. No. 3,196,011; and Gunclach and Clause, A Cyclic Xerographic Method Based on Frost Deformation, Photographic Science and Engineering 7, No. 1, 14–19 (Jan.–Feb. 1963).

Typically the latent electrostatic image is placed on the member and then the softenable layer is softened but an imaging member with an already softened softenable layer may have a latent charge image deposited on the member to cause migration as soon as the migration marking material receives the charge. Photosensitive migration marking material may be used, with or without uniform exposure to light, after forming a latent charge image by the above described electrical techniques. In some modes, such uniform exposure has been found to enhance migration by lowering the potential of the latent charge image required for migration.

The magnitude of the electrostatic latent image typically applied in this particular mode of forming a latent image need be only above the threshold to produce migration with the particular combination of materials used. As a practical matter, it is found generally to be preferred to apply a field within binder layer 11 of at least about 10 volts/micron to insure optimum quality images while images have been produced with charge images producing a field within binder layer below the 10 volts/micron figure and even below 4 volts/micron.

According to mode (A)(b) hereof oppositely charged image shaped electrodes may be disposed adjacent opposite sides of a uniformly charged binder member to create an imagewise electrical migration force. Many specific modes of applying forces according to modes (A)(c) and (A)(d) will occur to those skilled in the art upon a reading of this disclosure.

Proceeding now to the (B) mode hereof, according to mode (B)(a) binder members hereof may be latent imaged by uniformly charging the member and selectively, in image pattern, physically altering, increasing or decreasing, the permeability of the softenable material to the migration marking material before, during or after charging. Any suitable technique of imagewise changing the permeability of the softenable layer may be used including:

(i) Imagewise hardening the softenable material before, after or during charging for example by exposing certain softenable materials to an image pattern of ultra violet radiation to cause imagewise hardening, for example, by techniques described in Gundlach U.S. Pat. No. 3,307,941. Staybelite Ester 10, for example, may be hardened in image configuration by exposure to a conventional ultra-violet lamp for several minutes through an image mask or stencil.

(ii) Imagewise softening the softenable material preferably after charging for example by exposing it to an infrared image pattern or by contacting it with a heated member in image configuration. If softened sufficiently, the subsequent softening step hereof may be omitted. The migration material or softenable material or the substrate or combinations thereof may absorb the infrared to cause the softenable material to become heated.

Depending upon specific materials employed in the imaging member and especially the material of softenable binder layer 11, other forms of activating radiation may be used to selectively modify (including hardening and softening) the permeability of softenable binder layer 11 to particle migration. Suitable methods include: X-ray treatment, Beta ray treatment, Gamma ray treatment and high energy electron bombardment.

(iii) Imagewise contamination of the softenable material to effect its viscosity preferably before or after charging for example by condensing volatile components from an adjacent sheet bearing an ink image.

After the imagewise alteration step, any suitable migration force, typically uniformly distributed over softenable binder material 11, may then be applied. For example, according to mode (B)(a) the imaging member may be uniformly charged to establish fields across the thickness of the imaging member as previously discussed above.

According to mode (B)(b) oppositely biased flat shaped electrodes may be disposed adjacent opposite sides of uniformly charged binder structured imaging members hereof to create even stronger uniform electrical migration forces across the entire imaging member.

Many specific modes of applying forces according to modes (B)(c), (B)(d) and (B)(e) will occur to those skilled in the art upon reading this disclosure. Illustratively for (B)(d), over relatively long periods for sufficient imagewise softening of softenable binder layer 11, centrifugal force alone may cause imagewise migration.

The development step in the migration imaging process is explained above with particular attention to the liquid solvent wash-away development mode. It should be clear that any suitable means may be used for softening or dissolving the softenable layer 11, thereby rendering the softenable material sufficiently permeable to migration of the migration marking material to permit migration or to permit what is often a latent imaged member after the migration force applying step hereof to become visibly (or detectable by other means) imaged.

For example, liquid solvents, vaporous solvents, heat, or combinations thereof, are typically suitable for accomplishing the development. The imaged effect is produced by the migration marking material imagewise migrating in depth into the bulk of softenable layer 11. Softening may occur prior, during or following the step of application of the migration force to the migration material and is the mechanism which permits selected portions of the migration material to imagewise migrate to locations in depth in the softenable layer, while the remaining migration material may remain substantially unmigrated, in the softenable material or migrate a shorter distance in the softenable material. When developing with a solvent vapor, an image comprising slectively migrated migration marking particles is typically formed at or near the surface of the supporting substrate.

Softening herein encompasses any suitable means for rendering the softenable layer more permeable to the migration marking material including such preferred modes as softening the softenable layer by subjecting it to heat or a vapor of a solvent for the softenable material or combinations thereof, or by relatively short duration exposing of the softenable layer to a solvent therefore, to cause swelling and some softening of the softenable layer. Softening also encompasses the case where the softenable material off the shelf, is sufficiently softened to render unnecessary a separate, distinct softening process step. For example, the migration material could be deposited in a layer which is softened enough by room temperature so that upon completion of the migration force applying step migration images are formed simultaneously, or soon thereafter.

Generally in vapor softening development, an imaging member according to this invention is exposed for a period of time to a solvent vapor, for example, in a chamber, generally in the absence of actinic radiation for the electrical-optical modes hereof. Generally any solvent liquid useful in liquid development, a partial listing of which is included in aforementioned 460,377 is suitable in vapor development according to this invention.

While vapors of a solvent for the softenable material generally are preferred, for vapor softening development some vapors may be used in vapor development which are from liquids which are not solvents or at least not good solvents for the softenable material. For example, the vapors of Freon 113 have been used to cause migration of a material in a custom synthesized 80/20 mole percent copolymer of styrene and hexylmethacrylate softenable material for which Freon 113 is not a ready solvent.

Also, solvent dip softening may also be accomplished in liquids which are not ready solvents for the softenable material.

In the imaging modes hereof where charges on the migration material are not a necessary part of the migration force, of course the electrically insulating nature of the vapor is less of a factor.

Softening times can be shorter for vapor development than for the solvent liquid wash away development of 460,377 because no time need be allocated to dissolving off the softenable binder layer 11. The exposure to the solvent vapor is usually for a short time such as from about ½ second or less up to about 1 minute and generally from about 1 second to about 10 seconds depending inter alia upon the temperature and concentration of the vapor, the strength of the solvent and the softenable material used. While a practical upper limit of 1 minute may be given for duration of vapor softening, it should be appreciated that, for limited vapor concentrations, for most materials, it is practically impossible to over develop since the migrating particles will reach a point, such as the softenable layer-support surface interface, or where the migrating portions of the marking material have dissipated their migration force, typically an electrical charge migration force, where migration stops no matter how permeable the softenable layer is. However, for some other materials it is noted that there is some loss of migrated material image deficition if vapor development is continued well after complete migration. A limiting factor for vapor development is that for long durations and high vapor concentrations the softenable binder layer will flow off the substrate and cause the imaging member to lose its form.

In exposing to the solvent vapor, the latent imaged imaging member may simply be held between a pair of tweezers and placed for a few seconds in the vapors contained above a small amount of liquid solvent or developer contained in a bottle. If greater control is desired, a graduated cylinder such as a 2 inch diameter 1,000 cc. graduate may be used, and partially filled with liquid developer. The member to be developed is then suspended for a few seconds at a predetermined point, such as the 500 cc. mark, while the graduate contains about 200 cc.'s of liquid developer, by using the above technique, images having a consistently high quality can be easily prepared. Of course, any suitable means of controlling vapor intensity may be used and many modes of doing so will occur to those skilled in the art upon reading this disclosure. If desired, the vapor can also be brought to the imaging plate through the use of fans, blowers, or the like, to maintain a constant vapor pressure. While regulation of vapor concentrations and vapor softening times are the primary variables in vapor softening, regulating the temperature of the vapor is another control over development, the warmer vapors genrally causing faster softening and migration.

If desired, mixtures of various solvents may also be used. For example, the vapors of a liquid mixture of up to 50% by volume of methylene chloride in Freon 113 provides a satisfactory solvent mixture for vapors.

Referring now to heat softening development, generally, the member is heat softened by exposing the imaging structure, for example, for a few seconds to hot air, infrared exposure, by contacting the substrate to a heated platen, or by dipping the imaging member in a heated non-solvent liquid, such as silicone oil.

The exposure to heat is usually for a short time such as from about 1 second or less up to about 10 seconds or longer depending upon intensity and type of heating used, depending on the particular type of softenable material, its viscosity-temperature relationship and other characteristics. It has been found to be preferred to heat the member from about 50° C. to about 150° C. for about 1 to about 10 seconds to produce optimum quality images. Generally temperatures in the range of 80° to 150° C. are usually sufficient with the heating time generally in the range of a few seconds.

While, typically, it is difficult to over heat soften, a limiting factor for some materials may be the fusing together of the migrated portions of the marking material to cause loss of definition of the image.

Of course, solvent vapor and heat softening may be used in combination or sequence to soften. For example, see aforementioned 612,122.

It will be understood that the imaged members hereof may be treated or further processed to change their character. For example, a liquid solvent may at any time after development be applied to such a migration image to convert it into a solvent wash-away image as taught in 460,377, now U.S. Pat. No. 3,520,681. In this regard, it is further noted that the liquid solvent applied need not be insulating; conductive liquids may be used.

It has also been found that the relatively non-migrated areas of migration material of such a migration image may be removed by abrasion to yield a more readily visible image, or such areas may be adhesively stripped off or the member split by other techniques to yield complementary positive and negative images.

Also the developed resultant image hereof and especially those where vapor softening is employed may be physically transferred from one substrate to another. Alternatively, a thin easily strippably interlayer such as Lexan polycarbonate from G.E. may be used between the softenable layer and the substrate to facilitate stripping without the need for a sharply acute stripping angle, to be discussed. In one case a Freon 113 vapor softened, resultant imaged member on an aluminized Mylar substrate was placed against a sheet of Plestar polycarbonate film from Ansco Div. of General Aniline & Film Corp., and the combination passed through pressure rolls heated to about 100° C. By bending the aluminized Mylar back at a sharp acute angle, to the plane of the top surface of the softenable layer, while stripping, the softenable layer containing unmigrated and migrated migration material in image configuration is transferred intact to the Plestar.

The imaged member produced after softening development may be utilized and viewed in a host of ways.

Although softenable material 11 and non-migrated areas of marking material 12 are not thereby washed away, after completion of the process steps of this invention, in contrast to the solvent liquid development, taught in aforementioned 460,377, now U.S. Pat. No. 3,520,681, the image produced may be viewed by its transmitted light, by its reflected light, by its scattered light with or without the unaided eye, and by means of special display techniques, including, for example, focusing light reflected from the member onto a viewing screen.

Images hereof also typically may be viewed by interferometric devices such as interference microscopes and holographic devices. In the latter, the image assumes the character of many close-spaced lines of varying frequency.

Also, the image may be recorded by other imaging methods and the recording viewed or otherwise utilized.

The images hereof are often highly suitable for display by transmitted light especially in the materials embodiment where the binder layer 11 is at least partially transparent and the material comprising migration marking material is substantially opaque. Thus the completely processed member may be used as a projection slide to produce a high resolution display of an image on a viewing screen or the like.

The images may also be displayed by means of a projection system such as shown in FIG. 1F of Gunther et al. U.S. Pat. No. 3,196,011 and optical systems employing reflected light such as taught in U.S. application Ser. No. 619,072, filed Feb. 27, 1967, now U.S. Pat. No. 3,519,344. Readout may also be by means of appropriate sensing means that can detect the selective displacement of particles. For example, magnetic sensing means may be used in conjunction with a migration material having a magnetic component.

The structures of this invention in general may be charged to a positive or negative surface potential ranging from about 10 to 4000 volts. The high voltages are typically used for imaging members having relatively thick insulating layers or substrates. The image sense is either positive or negative, i.e., the migration marking particles deposit in the unexposed or exposed areas depending on the binder or softenable material, and processing materials as shown, for example, for a number of pigments in Table I.

development, with images that were nearly always positive-to-negative (p-n), which comprise a negative image of an original image formed by photosensitive particles deposited in the areas exposed to activating radiation.

All of the factors which influence whether a given migration marking particle will image in the positive-to-positive or positive-to-negative mode are not fully understood. However, it is known that the imaging mode can be influenced by the choice of (1) sign and magnitude of the applied field or surface charge, (2) choice of softenable material, (3) choice of solvent used in vapor softening; (4) choice of particle composition; as well as other processing variables including temperature. Thus, one should select from the typical materials, softening techniques, and softenable materials listed herein, those which will produce images in the desired mode.

The ratio of photosentitive pigment or migration working particles or softenable material ranges from about 1 part by weight photoconductive pigment, to about 1 to 12 parts by weight of binder. Greater amounts of binder than 12 to 1 typically result in an unexceptable loss in image density, although an image may still be formed at binder-particle ratios exceeding 12 to 1.

TABLE I

IMAGE SENSE* *vs.* PROCESSING CONDITIONS

| | | Piccotex Binder Plates | | | | Staybelite Binder Plates | | | | |
|---|---|---|---|---|---|---|---|---|---|---|
| Photosensitive Pigment | Developing Solvent | Trichloroethylene Dev. | | Cyclohexane Dev. | | Trichloroethylene Dev. | | Cyclohexane Dev. | | Pigment Supplier |
| | Surface Charge | + | − | + | − | + | − | + | − | |
| Algol Yellow | | p-p | p-p | | | | | | p-n | General Aniline & Film |
| Benzidine Yellow | | p-p | p-n, low V<br>p-p, high V | p-n, low V<br>p-p, high V | p-p | | | | | duPont |
| Cyan Blue | | p-p | p-p | p-p | p-p | | | p-p | p-n | Harmon Color |
| Diane Blue BR-34 | | p-p | p-n | p-p | p-p | p-p | | p-p | p-n | Harmon Color |
| Indigo | | p-n, low V<br>p-p, high V | p-p | p-p | p-p, (poor) | | p-n | p-n | p-n | Allied Chemical |
| Indofast Yellow Toner | | p-p | p-p | p-p | p-p | p-p | p-p | p-p | p-p | Harmon Color |
| Monastral Red RT-790D | | p-n | p-n | p-n | p-n | p-p | | p-n | p-n | duPont |
| Monolite Fast Blue | | p-n, low V<br>p-p, high V | p-p | p-p | p-n, low V<br>p-p, high V | | | p-p | p-n | I.C.I. Inc. |
| Naphthol Red B | | p-p | p-p | p-n, low V<br>p-p, high V | p-p | | | p-n | p-n | American Cyanamid |
| Phthalocyanine "X" | | p-p | | p-p | p-p* | | | | p-n | Xerox Patent Application Serial No. 505,723 |
| Pyrazolone Red B Toner | | all off | p-p | p-p | p-p | | | | | Max Marx Color & Chem. Co. |
| Quindo Magenta | | p-p | p-p | p-p | p-p | p-p | p-p | p-n | p-n | Harmon Color |
| Watchung Red B | | p-p | p-p | p-p | p-p | p-p | p-n | p-n | p-n | duPont |

* Image sense is defined as either positive to positive (p-p) or positive to negative (p-n), depending upon whether the photosensitive particles are deposited in the areas which are unexposed or exposed to activating radiation.

Piccotex binder plates gave the best results with positive charging and trichloroethylene development, with images that were nearly always positive-to-positive (p-p), which comprise a positive image of the original image formed by marking particles deposited in the unexposed area. Staybelite binder plates gave the best results with negative charging and cyclohexane An imaged binder structured migration imaging member of this invention typically comprises a softenable binder matrix having regions therein where the migration marking material is substantially migrated toward one surface of said matrix, and other regions wherein the migration marking material remains in substantially its original unmigrated disposition, dispersed throughout the binder matrix. In the migrated areas the marking material will be more concentrated (higher pigment/binder ratio) near the surface of the softenable binder matrix toward which said marking material has migrated in depth in the softenable material. Where the binder matrix is imaged on a substrate, the relatively concentrated imagewise migrated particles are typically at the substrate-binder matrix interfaces or actually touching the substrate itself. In these areas softenable material portions from which particles migrated will have low pigment/binder ratios or even be substantially denuded of any migration material.

The migration images formed by this invention can have a variety of physical, chemical, electrical, and optical properties based on the imagewise separation of migration material:

(a) The migration image has been observed to imagewise selectively discharge by charge transfer upon exposure to light so that it can be charged and uniformly exposed to light to produce a usable electrostatic image corresponding to the migration image. This charge image, for example, can be rendered visible by conventional xerographic developing techniques.

(b) The migration image may be used as a mask to selectively expose the softenable layer to hardening ultra violet radiation.

(c) If the migration image employs migration material which is magnetic, it may then be used as a magnetic image.

(d) The migration image may be used to produce a different image by selective reaction of the migration material according to its position relative to a reacting substrate or reacting marking material.

(e) The migration image, with or without the softenable layer removed, may be used to selectively expose its substrate which may be photosensitive such as a diazo layer, a Kalvar film, a photographic emulsion or a layer of photoresist.

Where a photohardenable (including photosoftenable) photosensitive substrate is used, for example, an etched, relief image may readily be formed from the imagewise photohardened substrate, which relief image, for example may be used as a printing plate. Use of the migration images hereof as an optical mask to form images in or on a photosentitive substrate affords imagewise projection sensitivity (the photohardening radiation typically is a uniform exposure), positive or negative imaging capability and delayed substrate exposure and development. The mask may be removed after the photohardening exposure.

A migration image associated with different sensitivity migration materials in the same softenable binder layer is unique in that it has different materials dispersed differently in depth depending on their sensitivity to the radiation being used. The different migration materials may also require different amounts of charge for migration either becuase of differences in size or because of differences in charge injection rates. In that case, the migration material need not be exposed to radiation to produce the migration image having different materials differently dispersed in depth.

The following examples further specifically define the present invention with respect to a migration imaging system employing a binder structured imaging member. The parts and percentages are by weight unless otherwise indicated. The examples below are intended to illustrate various preferred embodiments of the novel, binder structured imaging member and migration imaging system.

EXAMPLE I

A sample of x-phthalocyanine was prepared by neat milling for 48 hours commercially prepared alpha metal-free phthalocyanine supplied by Holland-Suco. This is accomplished by milling 40 grams of the commercial phthalocyanine with 1500 grams of 13/16" burundum cylinders in a size 00 Roalax jar on a roller mill turning at 72 r.p.m. After milling, 100 ml. of methanol is added to the jar, the slurry filtered, washed in more methanol, and dried.

A dispersion coating solution is then prepared by combining 1 gram of the x-phthalocyanine, 10 grams of Piccotex 100, 10 grams of toluene, and about 20 grams of ⅛" low-carbon steel balls in a two-ounce jar and agitated in a Red Devil Quickie Mill for 30 minutes.

After removing the steel balls, this solution is coated onto a bright finish aluminum sheet 5 mils thick with a number 5 wire wound rod and dried in air to give a thickness of 9 microns.

EXAMPLE II

A dispersion coating solution is prepared by ultrasonic mixing; 1 part zinc oxide powder, about 0.1 micron average diameter (Florence Green Seal #8 zinc oxide, obtained from The New Jersey Zinc Company) to 1 part silicone resin SR 82 (General Electric Corp.), in toluene for about one minute. This dispersion is poured over an aluminum sheet and dried at 50° C. for one hour to give a thickness of about 12 microns.

EXAMPLE III

A second sample of x-phthalocyanine was prepared by first neat milling for 15 days commercially prepared alpha metal-free phthalocyanine supplied by Holland-Suco to make a seed material. This is accomplished by milling 40 grams of the commercial phthalocyanine with 1500 grams of 13/16" burundum cylinders in a size 00 Roalax jar on a roller mill turning at 72 r.p.m. After milling, the phthalocyanine was scraped off of the jar and milling cylinders and removed together with the loose powder. After preparing the seed material, larger amounts of x-phthalocyanine are made by milling 9.5 grams of the commerical phthalocyanine with 0.5 gram of the seed material in a ½ quart glass jar filled with 60 glass marbles (⅝" diameter) and 200 grams of methyl ehtyl ketone on a roller mill turning at 130 r.p.m. for 18 hours. The contents of the jar are filtered and air dried at 50° C. for one hour.

A dispersion coating solution is then prepared by combining 1 gram of x-phthalocyanine, 3 grams of Piccotex 100, 25 grams of Isopar-G, and 60 grams of ⅛" steel balls, and agitating the solution in a Red Devil Quickie Mill for 48 hours.

After removing the steel balls, the solution is coated onto 3 mil Mylar with a Gardner Draw Coater using a ½ mil Bird applicator, and air dried at 70° C. for one hour.

EXAMPLE IV

Samples are prepared as in Example III, except the one gram of x-phthalocyanine in the dispersion coating solution is replaced by one gram of a mixture of 0.21 gram of x-phthalocyanine, 0.14 gram of Algol Yellow, and 0.65 gram of Irgazine Red.

EXAMPLE V

A dispersion coating solution is prepared by combining 10 grams of elemental selenium alloyed with arsenic (2% by weight of arsenic), 5 grams of a copolymer of hexylmethacrylate and styrene, 13 grams of toluene, and milling with flint balls in a size 000 ball mill jar for 96 hours.

After removing the milling balls, this solution is coated onto aluminized Mylar with a Gardner Draw Coater using a ½ mil Bird applicator, and air dried for 24 hours.

EXAMPLE VI

The plate prepared as in Example I is used to make an image by:

| | |
|---|---|
| (1) Charging: | +500 volts. |
| (2) Exposing: | 0.3 f.c.s. (foot-candle-seconds)—tungsten lamp with a color temperature of 3400° K. |
| (3) Developing: | Immersing in trichloroethylene liquid for a few seconds. |
| (4) Result: | A positive-to-positive image of high contrast. |

EXAMPLE VII

A plate prepared as in Example I except with Staybelite 10 in place of the Piccotex 100 is used to make an image by:

| | |
|---|---|
| (1) Charging: | −600 volts. |
| (2) Exposing: | 0.25 f.c.s.—tungsten lamp with a color temperature of 3400° K. |
| (3) Developing: | Immersing in cyclohexane liquid for a few seconds. |
| (4) Result: | A positive-to-negative image of high contrast. |

EXAMPLE VIII

A plate prepared as in Example I except with Monastral Red (RT 7900 from DuPont) in place of the x-phthalocyanine is used to make an image by:

| | |
|---|---|
| (1) Charging: | +300 volts. |
| (2) Exposing: | 200 f.c.s.—tungsten lamp. |
| (3) Developing: | Immersing in cyclohexane liquid for a few seconds. |
| (4) Result: | A positive-to-negative image. |

EXAMPLE IX

A plate prepared as in Example I except with Algol Yellow (from General Analine Film Co.) in place of the x-phthalocyanine is used to make an image by:

| | |
|---|---|
| (1) Charging: | +400 volts. |
| (2) Exposing: | 1000 f.c.s. |
| (3) Developing: | Immersing in trichloroethylene liquid for a few seconds. |
| (4) Result: | A positive-to-positive image. |

EXAMPLE X

A plate prepared as in Example I except with Watchung Red B (from DuPont) in place of the x-phthalocyanine is used to make an image by:

| | |
|---|---|
| (1) Charging: | +450 volts. |
| (2) Exposing: | 200 f.c.s. |
| (3) Developing: | Immersing in trichloroethylene liquid for a few seconds. |
| (4) Result: | A positive-to-positive image. |

EXAMPLE XI

A plate prepared as in Example X except with Staybelite 10 in place of Piccotex 100 is used to make an image by:

| | |
|---|---|
| (1) Charging: | +425 volts. |
| (2) Exposing: | 1000 f.c.s. |
| (3) Developing: | Immersing in cyclohexane liquid for a few seconds. |
| (4) Result: | A positive-to-negative image. |

EXAMPLE XII

A plate prepared as in Example II is used to make an image by:

| | |
|---|---|
| (1) Charging: | −400 volts. |
| (2) Exposing: | 500 f.c.s. |
| (3) Developing: | Immersing in carbon tetrachloride for 40 seconds agitation. |
| (4) Result: | A positive-to-negative image with a resolution greater than 10 lp./mm. |

EXAMPLE XIII

A plate prepared as in Example III is used to make an image by:

| | |
|---|---|
| (1) Charging: | +4000 volts on a grounded plate. |
| (2) Exposing: | 1 f.c.s.—tungsten lamp. |
| (3) Developing: | Immersing in trichloroethylene liquid for a few seconds agitation. |
| (4) Fixing: | Overcoating by dipping in a 5% solution by weight of Bavick 11 (a methacrylate molding and extrusion compound available from Baker Chemical Company) in toluene, and air drying. |
| (5) Result: | A positive-to-positive image with a resolution of 228 lp./mm., a gamma 5, maximum density 1.6 and minimum density of 0.1*. |

*When used as an input to blowback by xerography, an excellent blowback is obtained using 4000 A° light.

EXAMPLE XIV

The plate prepared as in Example III is used to make an image by:

| | |
|---|---|
| (1) Charging: | −4000 volts on a grounded plate. |
| (2) Exposing: | 25 f.c.s. |
| (3) Developing: | Immersing in a trichloroethylene liquid for a few seconds agitation. |
| (4) Fixing: | Overcoating by dipping in a solution of Bavick 11 in toluene, and air drying. |
| (5) Result: | A positive-to-positive image with a resolution of 228 lp./mm., a gamma of 1, maximum density 1.5, minimum density 0.4 when viewed in red light. |

EXAMPLE XV

A plate prepared as in Example IV is used to make an image by:

| | |
|---|---|
| (1) Charging: | +4000 volts on a grounded plate. |
| (2) Exposing: | 3 f.c.s. |
| (3) Developing: | Immersing in trichloroethylene liquid for a few seconds agitation. |
| (4) Fixing: | Overcoating by dipping in a solution of Bavick 11 and toluene, and air drying. |
| (5) Result: | A positive-to-positive image with a resolution of 60 lp./mm. appearing as a black image with excellent contrast and a gamma of 1. |

EXAMPLE XVI

The plate prepared as in Example III is used to make a migration image subsequently made into a photoelectrosolographic image by:

| | |
|---|---|
| (1) Charging: | +4000 volts on a grounded plate. |
| (2) Exposing: | 1 f.c.s. |
| (3) Developing: | Exposure to toluene vapor in the dark then dip in trichloroethylene liquid for a few seconds of agitation. |
| (4) Fixing: | Overcoating by dipping in a solution of Bavick 11 and toluene and, air drying. |
| (5) Result: | Migration image formed after exposure to toluene vapor. This image converted to a PHSO image by dipping in trichloroethylene liquid. High resolution, high contrast image formed. Positive-to-positive image. |

EXAMPLE XVII

The plate prepared as in Example V is used to make an image by:

| | |
|---|---|
| (1) Charging: | +800 volts. |
| (2) Exposing: | 70 f.c.s. |
| (3) Developing: | Immersing in 1,1,1-trichloroethane liquid for a few seconds agitation. |
| (4) Fixing: | Overcoating by dipping in a solution of Bavick 11 and toluene, and air drying. |
| (5) Result: | A positive-to-negative image with a contract density of greater than 1. |

EXAMPLE XVIII

The plate prepared as in Example V is used to make an image by:

| | |
|---|---|
| (1) Charging: | +800 volts. |
| (2) Exposing: | 70 f.c.s. |
| (3) Developing: | Immersing in trichloroethylene liquid for a few seconds agitation. |
| (4) Fixing: | Overcoating by dipping in a solution of Bavick 11 and toluene, and air drying. |
| (5) Result: | A positive-to-positive image. |

When using an insulating or dielectric substrate such as illustrated in Examples III, IV, and XII–XVI, the capacitance of the dielectric substraate should be in the range of about 10 to 1000 times less than that of the softenable binder layer.

EXAMPLE XIX

A plate is prepared by dissolving about 9 parts of Bakelite Resin 5254 in a solvent blend of about 10 parts toluene, and about 7 parts acetone. To this solution is added about 1 part 2,4,7-trinitrofluorenone and about 1 part Titanox RA-10. The mixture is stirred until all of the materials are well dispersed and the solution is coated onto an aluminum sheet to a thickness of about 5 microns by means of a Bird applicator, available from Bird & Sons Inc. The titanium dioxide is seen to be uniformly dispersed throughout the resin layer. The plate is charged to a negative potential by means of a corona unit maintained at about 6500 volts. The charged plate is exposed to a light and shadow pattern. Total exposure is about 250 ft/candle seconds. The plate bearing the latent electrostatic image is immersed in a developer solvent bath consisting of carbon tetrachloride for about 20 second. The plate is then removed from the developer bath and dried. A positive image corresponding to the original is observed on the plate. It appears that titanium dioxide in image areas migrated to the surface of the plate while the resin and titanium dioxide in non-image areas have been removed by the solvent.

EXAMPLE XX

A plate is prepared as in Example XIX except that in place of the titanium dioxide is used powdered barium sulfate. A plate is charged, exposed and developed as in Example XIX. A positive image corresponding to the original is obtained.

EXAMPLE XXI

An imaging member is prepared as in Example XIX having powdered black iron oxide dispersed therein in place of the titanium dioxide. The plate is charged, exposed and developed as in Example XIX. A positive image corresponding to the original is obtained on the imaging member.

EXAMPLE XXII

An imaging member is prepared by depositing about a 4 micron binder layer on a 3 mil Mylar substrate. The binder is formed by coating a mixture of about 1:3 parts by volume iron particles to Piccotex 100 onto the substrate. The iron particles are smaller than about 0.5 micron.

The member is latent imaged and developed simultaneously by placing it in the vapors of 1,1,1-trichloroethane for about 10 seconds while bringing a shaped magnet against the back of the film.

As a result, the iron particles migrate in depth and cluster at the edges of the magnet forming an outline of the magnet in which the outline appears more dense.

EXAMPLE XXIII

An imaging member is prepared by depositing a double layer of softenable material on an aluminized Mylar substrate, the top layer being about a 2 micron layer of Piccopale H–2 containing X-form metal-free phthalocyanine particles of less than about 0.5 micron in average diameter dispersed throughout the layer in a pigment to binder weight ratio of about 1 to 3. The bottom layer is Piccotex 100 about 2 microns thick.

The member is latent imaged by uniformly electrostatically charging it to a positive surface potential of about 200 volts and exposing it to a negative image with exposure in exposed areas being about 0.5 f.c.s.

The latent imaged member is developed by exposing it to the vapors of Freon 113 for about 20 seconds.

An imaged member results wherein the unexposed particles migrate into the Piccotex 100 while exposed particles all remain uniformly dispersed in the HP-100 layer to give an imaged member which appears in transmitted light as a positive.

EXAMPLE XXIV

An imaging member is prepared by forming on an aluminized Mylar substrate, a softenable layer about 2 microns thick of a Staybelite Ester 10 binder having zinc oxide particles about 0.5 micron in average diameter uniformly dispersed throughout the binder in a dry weight ratio of pigment to binder of about 1/1. The migration layer is about a 0.5 micron thick layer of iron powder embedded at the upper surface of the softenable layer.

The member is latent imaged by uniformly electrostatically charging it to a negative surface potential of about 240 volts and exposing it to an image with exposure in exposed areas being about 200 f.c.s.

The latent imaged member is developed by exposing it to the vapors of Freon 113 for about 10 seconds to migrate the iron particles and zinc oxide particles in only the unexposed areas. The imaged member is more transparent in the nonexposed areas.

The plates or films of this invention are unique in that, unlike conventional xerographic type plates, these films do not require an appreciable electrostatic contrast in order to operate effectively. These films may be used satisfactorily with the electrostatic image existing predominately across the binder layer.

Although specific components and proportions have been stated in the above description of the preferred embodiments of the migration imaging system employing a binder structured imaging member, other suitable materials and variations in the various steps in the system as listed herein, may be used with satisfactory results and various degrees of quality. In addition, other materials and steps may be added to those used herein and variations may be made in the process to synergize, enhance, or otherwise modify the properties of the invention. For example, the solvents, binder materials, photosensitive materials, and other marking materials, which are used and disclosed in the above mentioned copending applications, will typically work for the binder structured imaging member of this invention. In addition, more than one marking material may be used in the same imaging structure, either mixed together or in separate layers in the imaging member. Another modification employs adding dyes to the marking material or to the softenable materials to enhance the sensitivity of the imaging strucutre or to change its imaging sense from positive-to-negative, to positive-to-positive.

It will be understood that various other changes in the details, materials, steps, and arrangements of elements, which have been herein described and illustrated in order to explain the nature of the invention, will occur to and may be made by those skilled in the art, upon a reading of this disclosure, and such changes are intended to be included within the principle and scope of this invention.

What is claimed is:

1. An imaging method comprising:

(a) providing an imaging member comprising a layer of softenable material having migration marking material dispersed through said softenable material, said softenable material capable of having its resistance to migration of migration marking material decreased sufficiently to allow migration of said material in depth in said softenable material;

(b) applying a migration force to said migration marking material; and (c) imagewise developing said imaging member by decreasing, in image configuration, the resistance to migration of migration marking material in depth in the layer of softenable material at least sufficient to allow imagewise migration of migration material at least in depth in said softenable layer.

2. An imaging method according to claim 1 wherein said softenable layer is substantially electrically insulating and said migration force is substantially uniform and is applied to said migration marking material by steps comprising uniformly electrostatically charging said member.

3. An imaging method according to claim 2 wherein said force applying step includes applying an external electric field to said member.

4. An imaging method according to claim 1 wherein said migration force is substantially uniform and is applied to said layer by steps comprising applying a uniform magnetic field to substantially uniformly magnetized migration marking material.

5. An imaging method according to claim 1 wherein said imagewise developing is by steps comprising exposing a softened softenable layer to an image pattern of hardening radiation.

6. An imaging method according to claim 1 wherein said imagewise developing is by steps comprising exposing a softenable layer to an image pattern of hardening radiation and applying a developing agent to said softenable layer to cause developing in the relatively softer areas.

7. An imaging method according to claim 1 wherein said imagewise developing is by steps comprising exposing the softenable layer to an image pattern of softening radiation.

8. An imaging method according to claim 6 wherein said developing agent comprises heat.

9. An imaging method according to claim 6 wherein said developing agent comprises a softening vapor for said material.

10. An imaging method according to claim 6 wherein said developing agent comprises heat and a softening vapor for said material.

11. An imaging method according to claim 8 wherein said softenable material is heated to between about 50° C. to about 150° C.

12. An imaging method according to claim 11 wherein said softenable material is maintained in said heated condition for from about 1 to about 10 seconds.

13. An imaging method according to claim 9 wherein said material is exposed to said softening vapor for a period of from about ½ to about 60 seconds.

14. An imaging method according to claim 2 wherein said migration marking material is photoconductive and wherein said migration force applying step includes a uniform exposure to activating radiation simultaneous with or after said charging step.

* * * * *